(12) United States Patent
Keller

(10) Patent No.: US 6,276,664 B1
(45) Date of Patent: Aug. 21, 2001

(54) WORM DRIVING A SERVO ACTUATOR WITH SPRING RETURN AND ROTARY VALVE EMPLOYING SAME

(75) Inventor: Robert D. Keller, Davisburg, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/443,665

(22) Filed: Nov. 19, 1999

(51) Int. Cl.7 ..................................................... F16K 31/04
(52) U.S. Cl. .................... 251/129.12; 251/69; 251/249.5
(58) Field of Search .......................... 251/129.11, 129.12, 251/248, 249.5, 69, 71; 74/425, 421 A

(56) References Cited

U.S. PATENT DOCUMENTS

| 4,533,114 | * | 8/1985 | Cory et al. ..................... 251/249.5 X |
| 4,546,787 | * | 10/1985 | Meyers et al. ................. 251/249.5 X |
| 4,616,528 | * | 10/1986 | Malinski et al. .............. 251/249.5 X |
| 4,686,863 | * | 8/1987 | Inoue et al. .................. 251/129.12 X |
| 4,754,949 | * | 7/1988 | Fukamachi ................... 251/129.11 X |
| 5,201,291 | * | 4/1993 | Katoh et al. .......................... 123/399 |
| 5,255,891 | * | 10/1993 | Pearson et al. ................. 251/129.11 |
| 5,775,292 | * | 7/1998 | Seeger ................................... 123/396 |
| 5,950,765 | * | 9/1999 | Pearson et al. ............... 251/249.5 X |

* cited by examiner

Primary Examiner—Kevin Shaver
Assistant Examiner—Eric Keasel
(74) Attorney, Agent, or Firm—Roger A. Johnston

(57) ABSTRACT

A motorized servo actuator has an output shaft rotated by a sector gear driven by a worm. The worm has a co-axially disposed torsion spring which is wound as the worm rotates. The worm is driven by a motor and gear train. In the event of motor failure during rotation of the sector gear in a given direction from an initial position, the wound torsion spring has sufficient stored energy to rotate the worm to return the sector gear to the initial position.

12 Claims, 2 Drawing Sheets

WORM DRIVING A SERVO ACTUATOR WITH SPRING RETURN AND ROTARY VALVE EMPLOYING SAME

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to worm driven servo actuated valves employing same of the type having a rotary valve member such as a blade, paddle or butterfly which is employed for directing flow of fluid or sonic pressure pulses in a passage such as the air inlet passage of an engine. Worm driven servo actuators are employed for numerous control purposes and are particularly suitable for rotary valves. Valves of this type are employed as engine air throttles, communication, or diverter valves within the engine inlet manifold for directing flow or pulses to a desired passage during engine operation depending upon the conditions under which the engine is operating at the time. Heretofore, servo operated rotary valves for air flow control or communication in a passage, such as an engine inlet passage have utilized speed reducers or gear trains driven by a low voltage high RPM sub-fractional horsepower or low wattage motor. It has been found desirable to use such a small low wattage motor to reduce the cost and bulk of the motor drive particularly where the valve is to be mounted as a throttle actuator on the engine air inlet or through an aperture in the engine inlet manifold for use as a diverter valve.

Where a servo motor operated valve is employed for engine air throttle applications or as a manifold air diverter valve, it has been found difficult to provide adequate torque with a small low wattage motor to insure proper valve movement and to simultaneously provide the desired speed of response of the valve to changes in the electrical control signal to the motor. This has proven to be particularly troublesome for a servo operated motor for throttle actuation in conjunction with cruise control operation of the engine on a motor vehicle.

In providing a servo motor operated air flow valve for either an engine air throttle or inlet manifold diverter valve, it has been desired to use a worm and gear arrangement for speed reduction, torque multiplication and silence of operation. However, in the event of failure of the servo motor with the valve in an operating position it has been found extremely difficult to provide a spring return of the valve where a worm and gear drive arrangement has been employed.

Known techniques for providing a spring return of an engine air throttle valve having a worm and gear operated servo motor drive are shown and described in U.S. Pat. No. 5,950,765 issued in the name of J. E. Pearson, et al. wherein a worm and gear arrangement provides for engagement of a sector gear when a pinion coaxial with the worm has reached the end of a sector face gear with which the pinion is engaged. However, the system employed in the aforementioned Pearson, et al. patent has a multiplicity of gears, is complicated and the spring return is provided on the output sector gear and thus requires a relatively high spring rate to provide the return of the valve against the overall reduction ratio. The relatively high spring rate of the sector gear return spring results in increased power requirement for the drive motor and has rendered this arrangement not only relatively high in cost for mass production but also bulky and heavy for the engine air throttle applications.

Other known arrangements include the throttle servo actuator described in U.S. Pat. No. 5,138,211 to Haefner, et al. wherein a ball-detent actuated clutch is disengaged upon de-energization of the motor. In the aforesaid known servo motor operated valve employing a clutch, the clutch is described as unclutched by de-energization of a solenoid. However, this arrangement also is complicated and requires a multiplicity of parts, is difficult to assemble and is dependent upon proper release of the clutch solenoid to permit the spring to return the valve. In the aforesaid arrangement of Haefner, et al., motor failure without separate release of the clutch solenoid would not allow the return spring to return the throttle. Thus, it has been desired to find a low cost, simple and reliable way or means for operating an air flow valve with a servo motor utilizing a worm drive and to provide for spring return of the valve in the event of motor failure in any position without requiring a high torque motor and a multiplicity of gears.

BRIEF SUMMARY OF THE INVENTION

The present invention provides a worm driven servo actuator and particularly such an actuator connected to a rotary valve which is assembled as a unit and installed in a passage for controlling the flow of fluid, such as air in an engine inlet, either for a throttle application or in the manifold as a diverter valve. The present invention uses a low wattage, high RPM motor driving a worm which engages an output sector gear connected to the rotary output member which may be a valve member. In the illustrated arrangement, the motor drives the worm through an intermediate gear; and, the worm has a return spring preferably in the form of a coil spring disposed coaxially with the worm. The worm driven servo motor actuator arrangement of the present invention enables the return spring to drive the worm a sufficient number of revolutions to return the output sector gear to an initial position should the motor fail at any point during operation. The valve embodiment employing the servo actuator arrangement of the present invention has the greater portion of the speed reduction occurring in the engagement of the worm with the output sector gear and thus minimizes stiffness required of the return spring and the torque requirement of the motor thereby permitting a low cost high RPM low wattage motor to be employed. This arrangement minimizes the size and bulk of the servo motor drive unit and facilitates installation of the drive on the rotary valve.

DETAILED DESCRIPTION OF THE INVENTION

Figure 1:
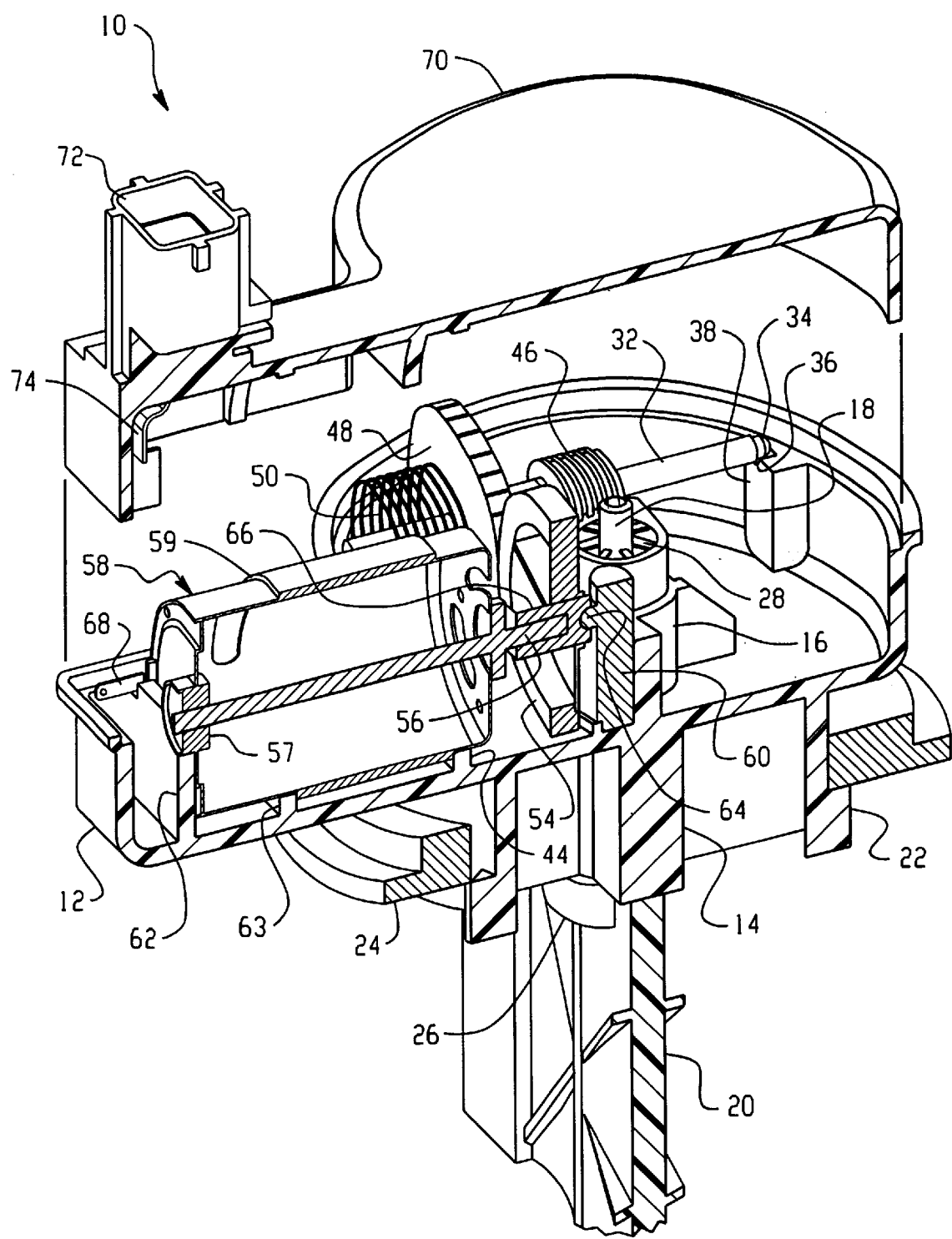
FIG. 1 is an axonometric view of the invention servo actuator embodied as a valve assembly sectioned through the motor shaft with the cover shown in exploded illustration.
Figure 2:
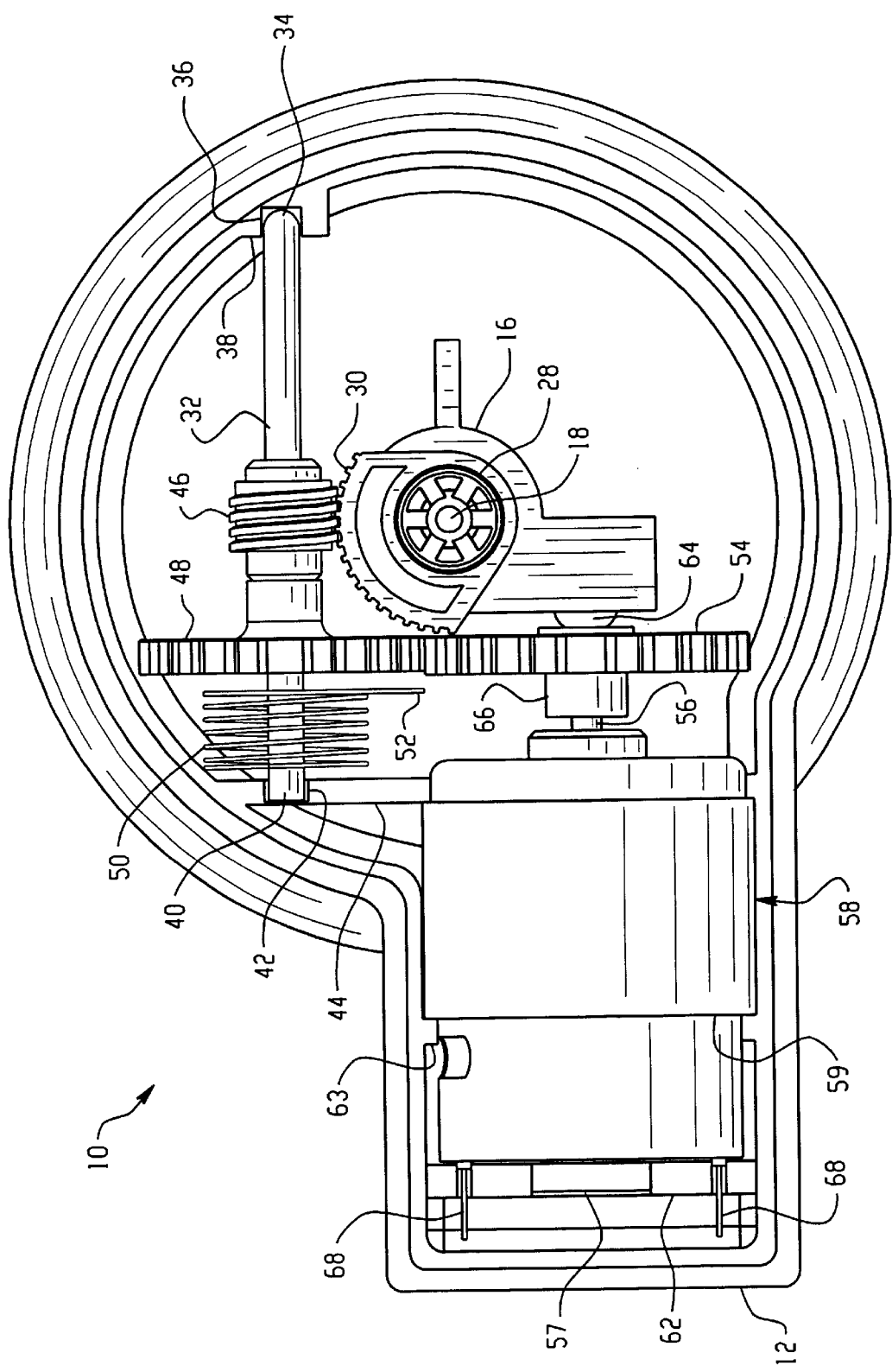
FIG. 2 is a top view of the assembly of FIG. 1 with the cover removed.

Referring to FIGS. 1 and 2, the servo actuator assembly of the present invention is embodied as a rotary valve indicated generally at 10 and includes a base or housing 12 configured as a cupped or open shell member with an external downwardly extending stanchion 14 and a corresponding stanchion or tower 16 provided on the inner surface of the housing. A shaft 18 is journalled through stanchions 14, 16 and extends downwardly from the housing. Shaft 18 has provided on the lower end thereof a rotary valve member 20 having a paddle or blade-like configuration in the presently preferred practice for an engine intake manifold communication valve application. However, it will be understood that valve member 20 may also comprise a disk or butterfly member if alternatively employed as an engine air throttle.

The housing 12 has an annular rib portion 22 extending downwardly from the undersurface thereof and which has provided thereon a mounting flange 24 such that the annular rib 22 and valve member 20 may be inserted into an aperture provided in the engine inlet manifold; and, flange 24 secured to the manifold in any convenient manner to retain the valve in the manifold. Valve member 20 has a generally cylindrical boss or flange 26 formed at the upper end thereof and which registers against the end of stanchion 14 and serves as a bearing surface. The upper end of the shaft 18 has provided thereon in driving engagement therewith an output sector gear 30 which is retained on the shaft by a suitable spring retainer clip 28, it being understood that any suitable retaining expedient may be employed as, for example, a cross pin or a welded washer.

A shaft 32 has one end 34 thereof journalled in a recess 36 provided in the upper end of a lug or rib 38 formed on the inner surface of the housing wall; and, the opposite end 40 of shaft 32 is journalled in a similar recess 42 formed in a rib 44 (see FIG. 2) provided in the housing shell 12. Shaft 32 has provided thereon, intermediate its ends, a worm 46 and a driven gear wheel 48, both of which are in rotary driving engagement with shaft 32. Worm 46 is in driving engagement with the teeth of sector gear 30. The shaft 32 has disposed thereabout, intermediate gear wheel 48 and the end 40, a torsion spring 50 in the form of a coil spring and which has one end registered against housing 12 and the opposite end 52 anchored to the shaft 32 to provide a predetermined torsional bias on the wheel 48, worm 46 and shaft 32. The spring 50 is wound to store energy as the motor turns the worm shaft 32. In the event of motor failure during operation after rotation of the sector gear 30 from an initial position, spring 50 has sufficient energy stored to rotate worm 46 in an opposite direction and return gear 30 to the initial position.

In the presently preferred practice for an engine manifold communication valve application, the worm 46 and sector gear 30 have a ratio of about 1:30; and, the sector gear includes an arcuate sector of about 80° for rotating valve 20 from an open to closed position, with the worm rotating about four to eight turns to give the full 80° rotation of valve 20. It will be understood however that for other applications different ratios of the worm and sector gear may be employed and, the sector gear may also comprise a complete gear wheel if desired.

In the presently preferred practice, the spring comprises a coil of about twenty turns having a pitch diameter of about 15 millimeters and is formed of wire of about 0.015 inches (0.4 mm) diameter wire and provides about 0.1 inch pounds of torque on the shaft 32 when the spring is wound five revolutions by the shaft 32.

Gear 48 is enmeshed with a motor drive gear wheel 54 which is drivingly connected to output shaft 56 of a drive motor indicated generally at 58 which has one end supported on rib 44 formed in the housing 12. The corresponding end of the motor shaft 56 is supported by a bearing surface 64 formed on a rib 66 provided in the housing 12 which engages a recess formed in the end of hub 66 of motor drive gear wheel 54.

Motor shaft 56 is journalled at the end opposite motor drive gear 54 by a bushing or bearing 57 which is supported by the rib 62 in the housing and also is supported in the casing of motor 58. In the present practice of the invention, an intermediate rib 63 is provided on the housing 12 and which is configured to conform to the motor casing and registers against the annular shoulder 59 provided on the motor housing. Motor 58 has a pair of electrical connector terminals 68 provided thereon for electrical connection thereto.

Motor drive gear wheel 54 and gear 48 have a ratio of about 2:1 to 2.5:1 to provide a speed increase of the shaft 32 from the speed of the motor shaft 56 in the present embodiment for an engine intake manifold diverter valve. It will be understood that the gear ratios of the worm and sector gear 46, 30 and the motor drive gear 54 and gear wheel 48 may be varied as desired for different applications. In the present practice of the invention, motor 58 has a torque rating of about 950 gram - centimeters at full load operating on 12 Volts DC; and, the motor has a no load RPM of 15,200; however, different motors may be employed as desired for providing the necessary output torque for other applications.

Referring to FIG. 1, a cover 70 is provided and is configured to interfit the periphery or rim of the housing 12 and has a receptacle 72 provided thereon which has an electrical connector extending therethrough to the interior of the cover which connector 74 makes contact with the motor terminal 68 upon assembly of the cover over housing 12. The cover 70 may be attached by any suitable expedient, as for example, snap locking or by weldment.

The present invention thus provides a servo actuator having a motorized worm drive to the output for maximizing speed reduction in a compact, light unit, and utilizes a torsion spring on the worm shaft to ensure return of the output to an initial position in the event of motor failure during operation. The servo actuator has particular application when connected as a rotary communication valve but the output may be connected for other uses.

Although the invention has hereinabove been described with respect to the illustrated embodiments, it will be understood that the invention is capable of modification and variation and is limited only by the following claims.

What is claimed is:

1. A method of operating a valve in a flow passage comprising:
   (a) disposing a valve member on a first shaft in the flow passage;
   (b) disposing at least a portion of a gear wheel on said first shaft;
   (c) disposing a worm on a second shaft and engaging said at least a portion of a gear wheel with the worm;
   (d) disposing a spring with said worm;
   (e) engaging a motor drive with the worm and energizing the motor and rotating said worm in one direction and moving said shaft and valve member; and,
   (f) biasing said worm with the spring and rotating said worm in a direction opposite said one direction upon de-energization of said motor.

2. The method defined in claim 1, wherein said step of rotating said worm includes driving said worm through a speed increasing gear train.

3. The method defined in claim 1, wherein said step of engaging with the worm includes providing a driven gear on said second shaft and engaging said driven gear with a motor gear.

4. The method defined in claim 1, wherein said step of disposing a spring includes disposing a coil spring about said second shaft.

5. A servo operated rotary valve assembly comprising:

(a) a base structure having a valve member rotatably disposed thereon and adapted for placement in a fluid flow passage;

(b) at least a portion of a gear wheel drivingly attached to said valve member;

(c) a worm disposed for rotation on said base structure and engaging said at least a portion of a gear wheel;

(d) a motorized drive connected to the worm and operative upon energization to rotate said worm in one direction for rotating said valve member; and, (e) a spring having an end thereof connected to the worm and operative for applying a torque to the worm for rotating the worm in a direction opposite said one direction, wherein upon energization of said motor and rotation of said valve member from an initial position to a limit position in said one direction and upon de-energization of said motor said spring is operative to rotate said worm and return said valve from said limit position to said initial position.

6. The valve assembly defined in claim 5, wherein said motorized drive includes a motor drive gear and a driven gear disposed concentrically with said worm, said driven gear engaging said motor drive gear.

7. The valve assembly defined in claim 5, wherein said motorized drive includes a drive motor and a speed increasing gear train operatively disposed between said motor and said worm.

8. The valve assembly defined in claim 5, wherein said spring comprises a coil spring disposed co-axially with said worm.

9. The valve assembly defined in claim 5, wherein said motorized drive has an overall speed reduction ratio of about 1:60.

10. The valve assembly defined in claim 5, wherein said worm and at least a portion of a gear wheel have a reduction ratio of about 1:30.

11. The valve assembly defined in claim 5, wherein said motorized drive includes a motor providing 950 gm cm torque and a no load speed of about 15,200 rpm operating on about 12 Volts D.C. electrical energization.

12. The valve assembly defined in claim 5, wherein said valve member is rotated through an included angle of about 80° from said initial position to said limit position.

* * * * *